United States Patent

Creps et al.

[11] Patent Number: 5,961,847
[45] Date of Patent: Oct. 5, 1999

[54] FILTER APPARATUS WITH DUAL DRIVE LOOPS

[75] Inventors: John L. Creps, Rudolph; Stephen N. McEwen, Bowling Green; Richard A. Hallett, Delta; Clayton E. Tenniswood, Bowling Green, all of Ohio

[73] Assignee: Henry Filters, Inc., Bowling Green, Ohio

[21] Appl. No.: 08/970,407

[22] Filed: Nov. 14, 1997

[51] Int. Cl.⁶ .................................................. B01D 33/04
[52] U.S. Cl. .......................... 210/783; 210/400; 210/401
[58] Field of Search ................................... 210/400, 401, 210/783

[56] References Cited

U.S. PATENT DOCUMENTS

| | | |
|---|---|---|
| 2,861,688 | 11/1958 | Harms . |
| 3,194,399 | 7/1965 | Harms ..................................... 210/104 |
| 4,055,497 | 10/1977 | Creps et al. .............................. 210/91 |
| 4,715,964 | 12/1987 | Harms ..................................... 210/783 |
| 4,761,226 | 8/1988 | Creps ..................................... 210/106 |
| 5,330,648 | 7/1994 | Benschoter et al. ..................... 210/387 |
| 5,338,443 | 8/1994 | McEwen ................................... 210/91 |
| 5,344,556 | 9/1994 | McEwen ................................... 210/91 |
| 5,565,112 | 10/1996 | Bratten ..................................... 210/780 |
| 5,601,729 | 2/1997 | Bratten ..................................... 210/783 |

*Primary Examiner*—Robert Popovics
*Attorney, Agent, or Firm*—Howard & Howard

[57] ABSTRACT

An improved filter apparatus includes an upper tank for holding dirty liquid and has a perforated plate. A lower compartment is beneath the plate for receiving liquid from the upper tank. A permanent filter belt for filtering particulate from the dirty liquid is arranged in a first circulating path across the plate. A first pair of drive loops are attached on respective sides of the belt. A drag conveyor having flights is arranged in a second circulating path across the plate. The belt is positioned between the plate and the flights of the conveyor across the plate. A second pair of drive loops are attached on respective sides of the flights. A driving mechanism is operable with the drive loops for indexing the belt and the conveyor along the circulating paths such that a fresh segment of the belt is periodically indexed over the plate while a dirty segment of the belt is being cleaned and the flights of the conveyor carry away accumulated particulate filtered by the belt.

20 Claims, 7 Drawing Sheets

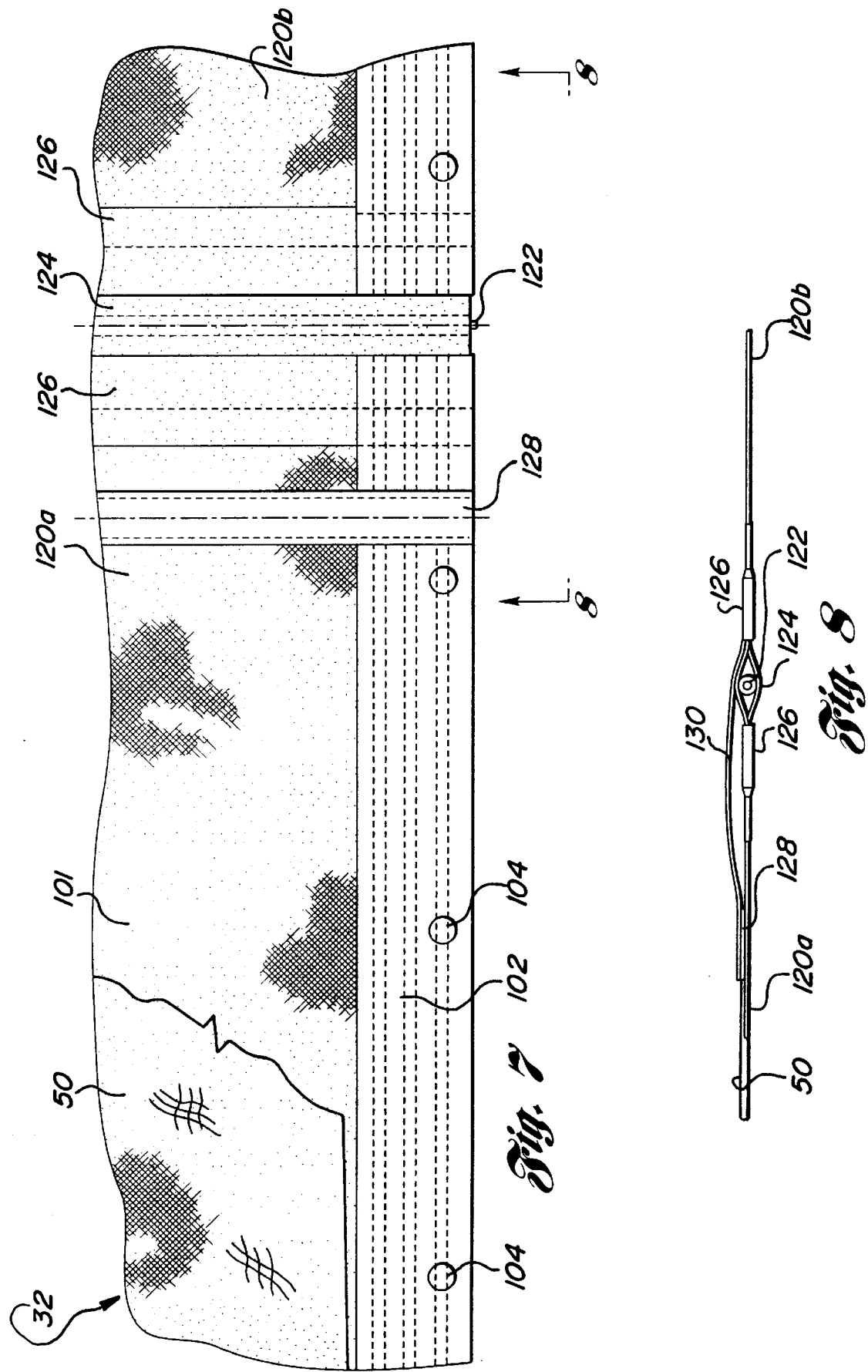

FILTER APPARATUS WITH DUAL DRIVE LOOPS

TECHNICAL FIELD

The present invention relates generally to liquid filters having drag conveyors and, more particularly, to liquid filters in which reusable filter media and a drag conveyor are moved over a perforated plate in a tank.

BACKGROUND ART

A typical liquid filter has a tank divided horizontally into an upper tank and a lower compartment. The upper tank receives dirty liquid to be filtered. A perforated plate or porous septum/screen separates the upper tank and the lower compartment. Filter media, such as a paper web, is driven across the perforated plate. A vacuum in the lower compartment induces liquid flow from the upper tank through the filter media and the perforated plate into the lower compartment. Such filters are used in connection with the filtration of machine tool liquid coolant in which cutting chips and other solid debris are filtered from the coolant by the filter media prior to being recirculated back to machine tools.

Filter media can take the form of disposable media (paper or roll) or a permanent or recleanable media belt. The permanent media belt is indexed periodically through the tank as the belt becomes clogged to advance a fresh segment onto the perforated plate. Each indexed segment is cleaned and recirculated back under tank and then over the perforated plate. Alternatively, a disposable media strip can be indexed periodically, each segment of which is collected for disposal after use. Both permanent and disposable media may be used in combination with the disposable media overlying the permanent media.

Filter media is often driven by a drag conveyor having a pair of spaced apart chain loops connected by flights extending across the width of the media. The flights carry the removed solids filtered by the filter media such as machining chips out of the tank.

The drag conveyor frictionally drives the permanent media belt. The weight of the chain loops and the flights of the drag conveyor bears on edges of the media belt to seal the same and create a frictional engagement to carry the media belt through the tank as the conveyor is periodically indexed. Only frictional engagement is used with disposable media.

A problem with frictionally driving the permanent media belt is that it is difficult to remove or replace the belt if it breaks during use. Another problem is the uneven wear on the permanent media belt.

What is needed is another pair of drive loops for driving the permanent media belt independently of the pair of drive loops driving the drag conveyor.

SUMMARY OF THE INVENTION

Accordingly, it is an object of the present invention to provide a filter having a first pair of drive loops for driving a permanent filter belt and a second pair of drive loops for driving a drag conveyor.

It is another object of the present invention to provide a filter in which a drag conveyor and a permanent filter belt may be driven at the same or different speeds.

In carrying out the above objects and other objects, the present invention provides a filter apparatus including an upper tank for holding dirty liquid and having a perforated plate. A lower compartment is beneath the perforated plate for receiving liquid from the upper tank through the perforated plate. The filter apparatus further includes a permanent filter belt for filtering particulate from the dirty liquid. The permanent filter belt is arranged in a first circulating path across the perforated plate. A first pair of spaced apart drive loops are attached on respective sides of the permanent filter belt.

The filter apparatus also includes a drag conveyor having a series of spaced apart flights. The drag conveyor is arranged in a second circulating path across the perforated plate. The permanent filter belt is positioned between the perforated plate and the flights of the drag conveyor across the perforated plate. A second pair of spaced apart drive loops are attached on respective sides of the flights.

A driving mechanism is operable with the first and second pairs of drive loops for indexing the permanent filter belt and the drag conveyor along the respective circulating paths such that a fresh segment of the permanent filter belt is periodically indexed over the perforated plate while a dirty segment of the permanent filter belt is being cleaned and the flights of the drag conveyor are periodically indexed to carry away accumulated particulate filtered by the permanent filter belt.

Further, in carrying out the above objects and other objects, the present invention provides a method for moving the permanent filter belt and the drag conveyor of the above-described filter apparatus. The method includes attaching the permanent filter belt across a first pair of spaced apart drive loops and attaching the flights of the drag conveyor across a second pair of spaced apart drive loops. The first and second pairs of drive loops are then driven to move the permanent filter belt and the drag conveyor along the respective circulating paths such that a fresh segment of the permanent filter belt is periodically indexed over the perforated plate while a dirty segment of the permanent filter belt is being cleaned and the flights of the drag conveyor are periodically indexed to carry away accumulated particulate filtered by the permanent filter belt.

The advantages accruing to the present invention are numerous. For instance, the extra pair of drive loops makes it much easier to remove, repair, and replace the permanent filter belt.

These and other features, aspects, and embodiments of the present invention will become better understood with regard to the following description, appended claims, and accompanying drawings.

BRIEF DESCRIPTION OF THE DRAWINGS

FIG. 7 is a top view illustrating the single connection between the segments of the permanent filter belt shown in FIG. 6;

FIG. 8 is a cross-sectional view of the single connection between the segments of the permanent filter belt shown in FIG. 7 along the line 8—8.

BEST MODES FOR CARRYING OUT THE INVENTION

Figure 1:
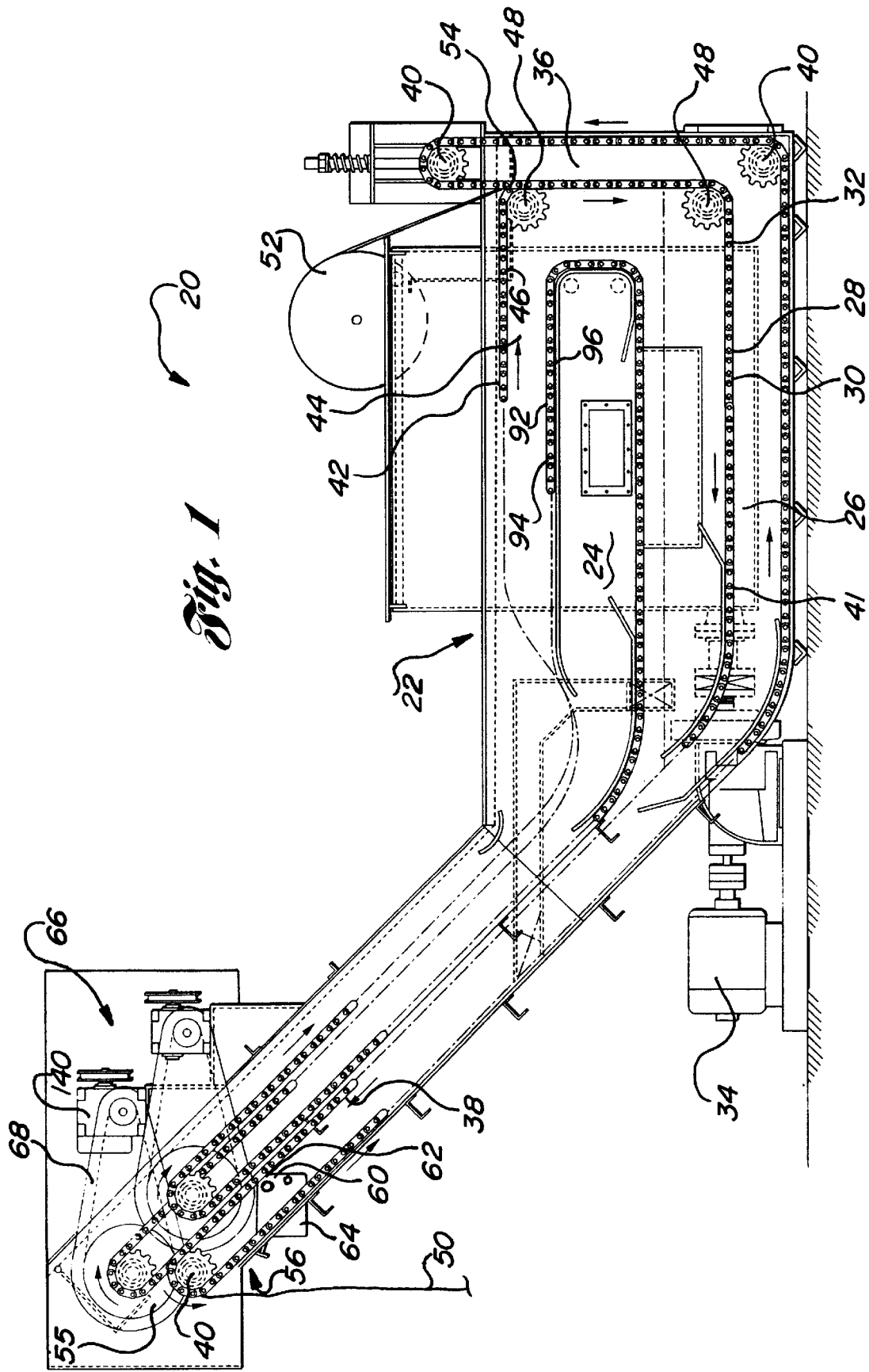
FIG. 1 is a side elevational view of a filter embodying the present invention.

Referring now to FIG. 1, a liquid filter 20 in accordance with the present invention is shown. Filter 20 includes a tank 22 provided with an upper tank 24 and a lower compartment 26. Upper tank 24 receives dirty liquid from a system requiring the return of filtered liquid for reuse in the system. A perforated plate 28 supported over tank floor 30 separates upper tank 24 from lower compartment 26. Perforated plate 28 is a metal screen or the like.

A permanent filter belt 32 interposes between upper tank 24 and perforated plate 28 to capture and retain contaminants from dirty liquid passing into lower compartment 26 through a segment of the filter belt overlying the plate. A pump 34 is connected to lower compartment 26 for generating a vacuum in the lower compartment to cause liquid to flow through permanent filter belt 32 into the lower compartment. The filtered liquid flows through pump 34 to the system for reuse (not specifically shown).

Permanent filter belt 32 is an endless belt arrange d to recirculate along a first circulating path down the inside of tank entrance wall 36, above and across perforated plate 28, up the inside of inclined tank exit wall 38, out of tank 22, back across the space below lower compartment 26, and back up the outside of tank entrance wall 36 prior to reentry into the tank. Permanent filter belt 32 is supported on idler wheels 40 along the first circulating path to be freely movable therealong. A first pair of spaced apart endless drive loops 41 such as chain loops (as shown) or belt loops drives permanent filter belt 32. Chain loops 41 drive permanent filter belt 32 to periodically advance a fresh segment onto perforated plate 28.

A second pair of spaced apart endless drive loops 42 such as chain loops (as shown) or belt loops each adjacent one sidewall of tank 22 drives a drag conveyor 44. Drag conveyor 44 includes flights 46 extending across the width of tank 22 connecting chain loops 42.

Drag conveyor 44 is arranged to recirculate along a second circulating path in tank 22 so that flights 46 carry removed solids such as machining chips out of the tank 22. Drag conveyor 44 recirculates along the second circulating path down the inside of tank entrance wall 36, above and across perforated plate 28, up the inside of inclined tank entrance wall 38, and back through the top portion of upper tank 24. Drag conveyor 44 is supported on idler wheels 48 along the second circulating path to be freely movable therealong.

In operation, permanent filter belt 32 is driven counterclockwise along the first circulating path and drag conveyor 44 is driven clockwise along the second circulating path. Permanent filter belt 32 and drag conveyor 44 converge above tank 22 near tank entrance wall 36 at the point indicated by reference numeral 54. From point 54, permanent filter belt 32 and drag conveyor 44 travel along the same direction with flights 46 of the drag conveyor 44 overlying the permanent filter belt. Permanent filter belt 32 and drag conveyor 44 travel from point 54 across perforated plate 28 with the permanent filter belt 32 interposed between the perforated plate and flights 46 of the drag conveyor.

Dirty liquid from upper tank 24 is then filtered by permanent filter belt 32 and passes through perforated plate 28 into lower compartment 26. Permanent filter belt 32 is indexed to move a fresh segment over perforated plate 28 once the permanent filter belt becomes clogged with filtered particulate from the dirty liquid. Drag conveyor 44 is also indexed periodically so that flights 46 carry the filtered particulate away from perforated plate 28, up the inside of inclined tank entrance wall 38, and out of tank 22 at the point indicated by reference numeral 55.

Permanent filter belt 32 and drag conveyor 44 diverge at point 55 such that the permanent filter belt 32 travels back through lower compartment 26 while the drag conveyor 44 travels back through the upper portion of upper tank 24. Permanent filter belt 32 and drag conveyor 44 subsequently meet at point 54 and the process repeats such that a segment of the permanent filter belt and a portion of the drag conveyor are constantly over perforated plate 28.

Filter 20 may further include a disposable filter strip 50 mounted in a roll 52 above tank 22 near tank entrance wall 36. Because permanent filter belt 32 and drag conveyor 44 meet at point 54, disposable filter strip 50 can be introduced between flights 46 and the permanent filter belt 32. Disposable filter strip 50 rests on, and is carried by, permanent belt 32 as they together pass over perforated plate 28. In the event permanent filter belt 32 is removed, drag conveyor 44 then frictionally drives disposable filter strip 50. Disposable filter strip 50 then travels through tank 22 across perforated plate 28 and then out of the tank at point 55 where it may be collected for disposal.

Permanent filter belt 32 includes a porous flexible strip material of suitable durability, such as a synthetic or natural fiber woven fabric. Disposable filter strip 50 is a commercially available porous paper.

A wash station 56 positioned outside of tank 22 along tank exit wall 38 cleans permanent filter belt 32. Wash station 56 includes a scraper 58, a water nozzle 60, and an air nozzle 62 positioned over a collection trough 64.

A drive mechanism 66 includes a drive belt 68 for driving the first pair of chain loops 41 and the second pair of chain loops 42.

Figure 2:
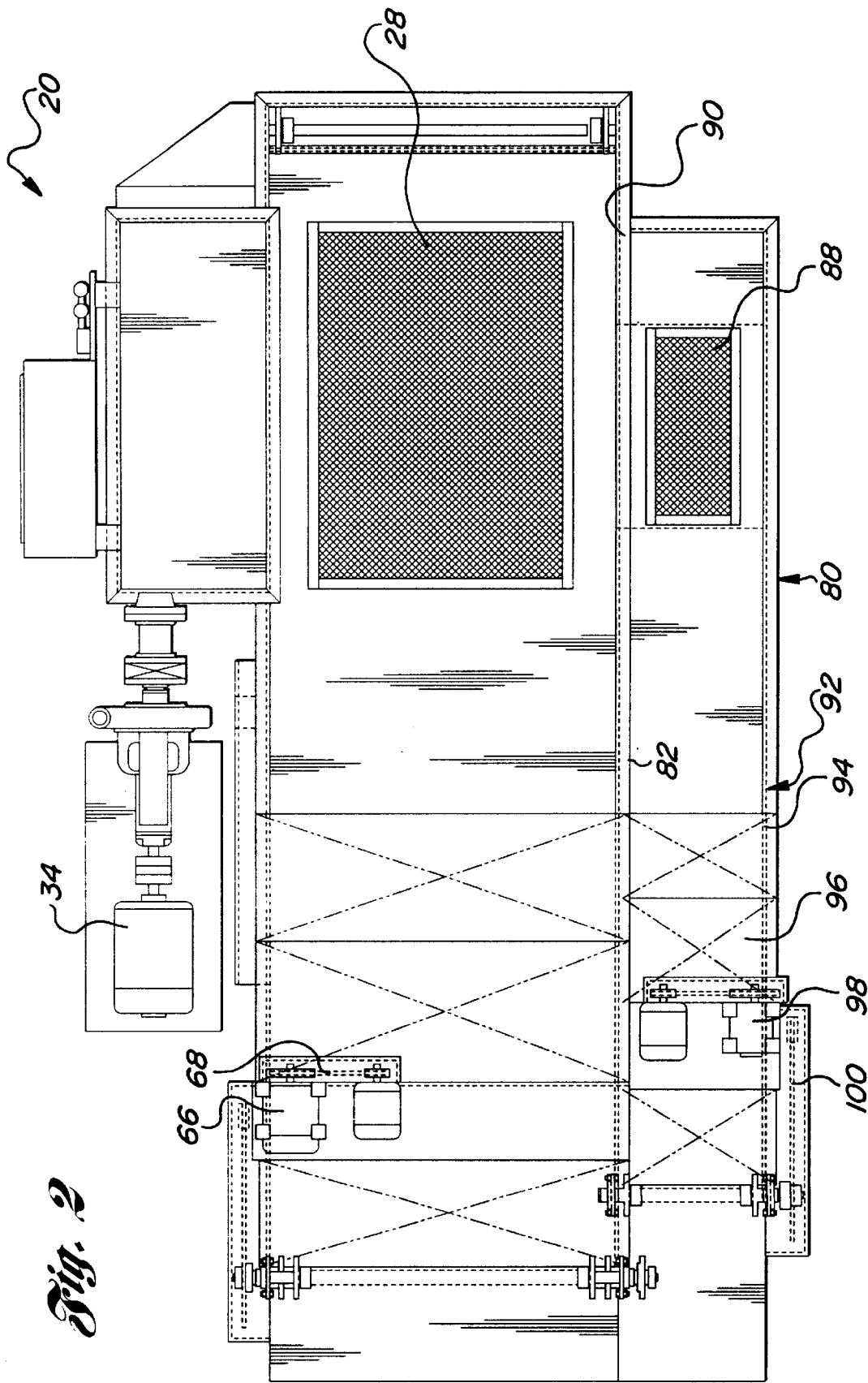
FIG. 2 is a top plan view of the filter shown in FIG. 1.
Figure 3:
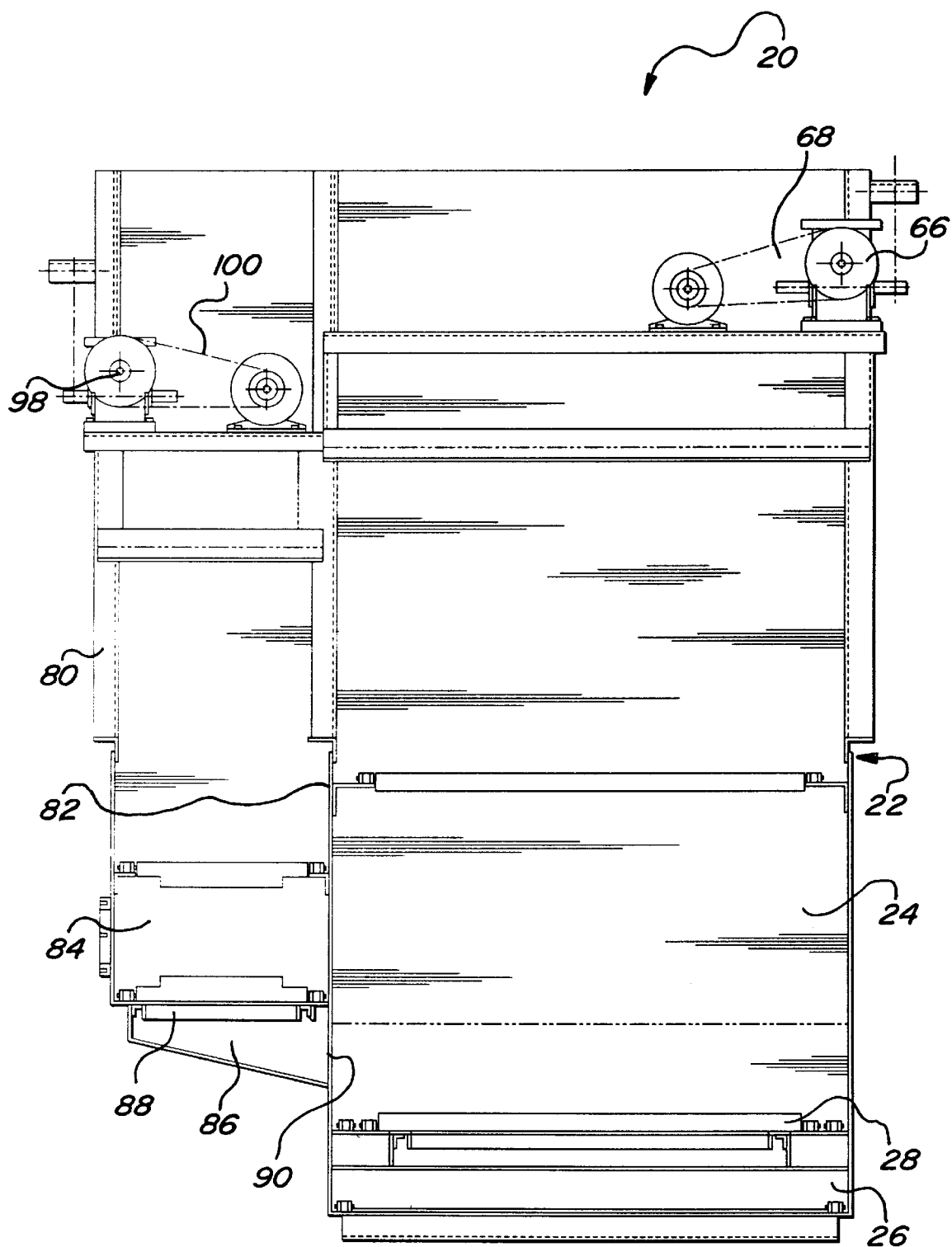
FIG. 3 is a side view of the filter shown in FIG. 1.
Figure 9:
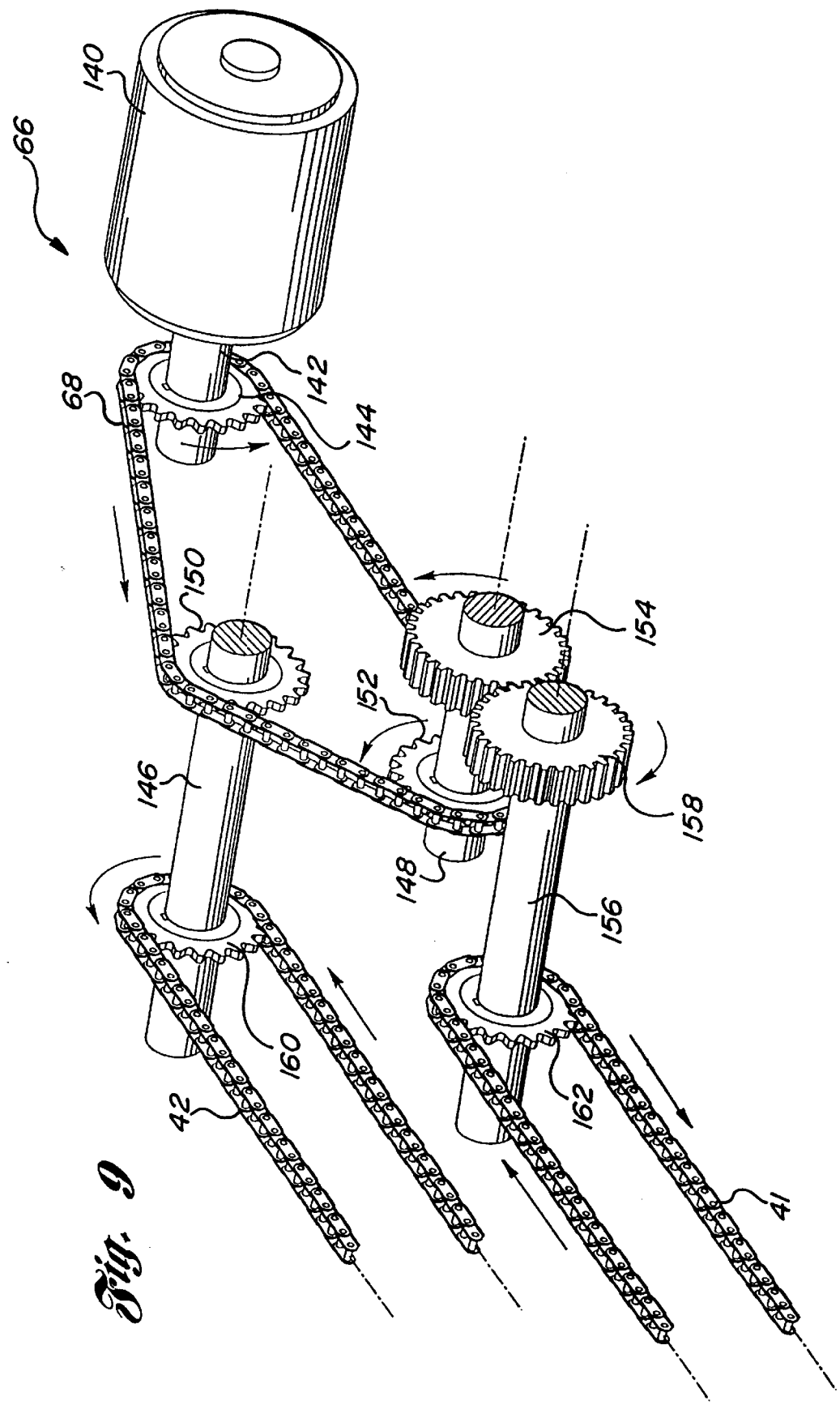
FIG. 9 is a schematic illustrating the driving arrangement for driving the first and second pairs of chain loops.

Referring now to FIGS. 2 and 3, with continual reference to FIG. 1, tank 22 further includes a primary tank 80 mounted to one sidewall 82 of the tank 22. Primary tank 80 includes an upper compartment 84 and a lower compartment 86 (FIG. 9). A perforated plate 88 separates upper compartment 84 from lower compartment 86. Lower compartment 86 is connected to upper tank 24 at outlet portion 90.

In operation, upper compartment 84 receives dirty liquid to be filtered. The dirty liquid passes through perforated plate 88 into lower compartment 86. Perforated plate 88 is suitable for filtering large sized contaminants out of the dirty liquid. On the other hand, perforated plate 28 is suitable for filtering out much smaller sized contaminants. Accordingly, primary tank 80 provides a first stage of rough filtering and tank 22 provides a second stage of fine filtering.

Primary tank 80 includes a drag conveyor 92 driven by a third pair of spaced apart endless drive loops 94 such as chain or belt loops. Drag conveyor 92 includes flights 96 for carrying away from upper compartment 84 the larger sized contaminants filtered out by perforated plate 88. A drive mechanism 98 includes a drive belt 100 for driving the third pair of chain loops 94.

Figure 4:
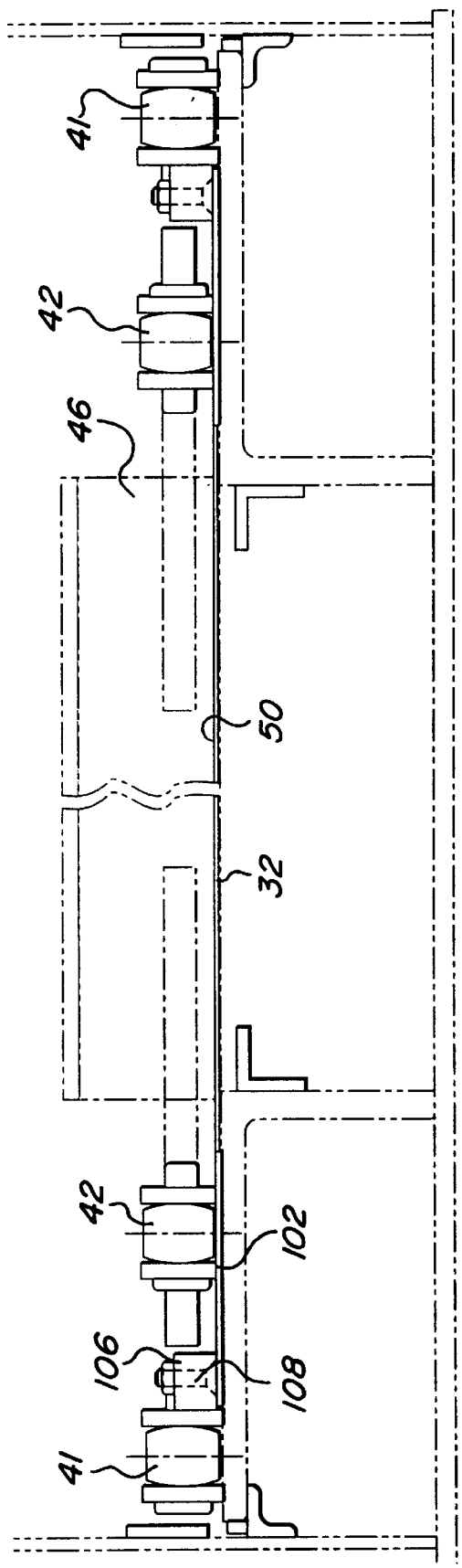
FIG. 4 is a cross-sectional view of the arrangement of the first and second pairs of chain loops of a filter embodying the present invention.
Figure 5:
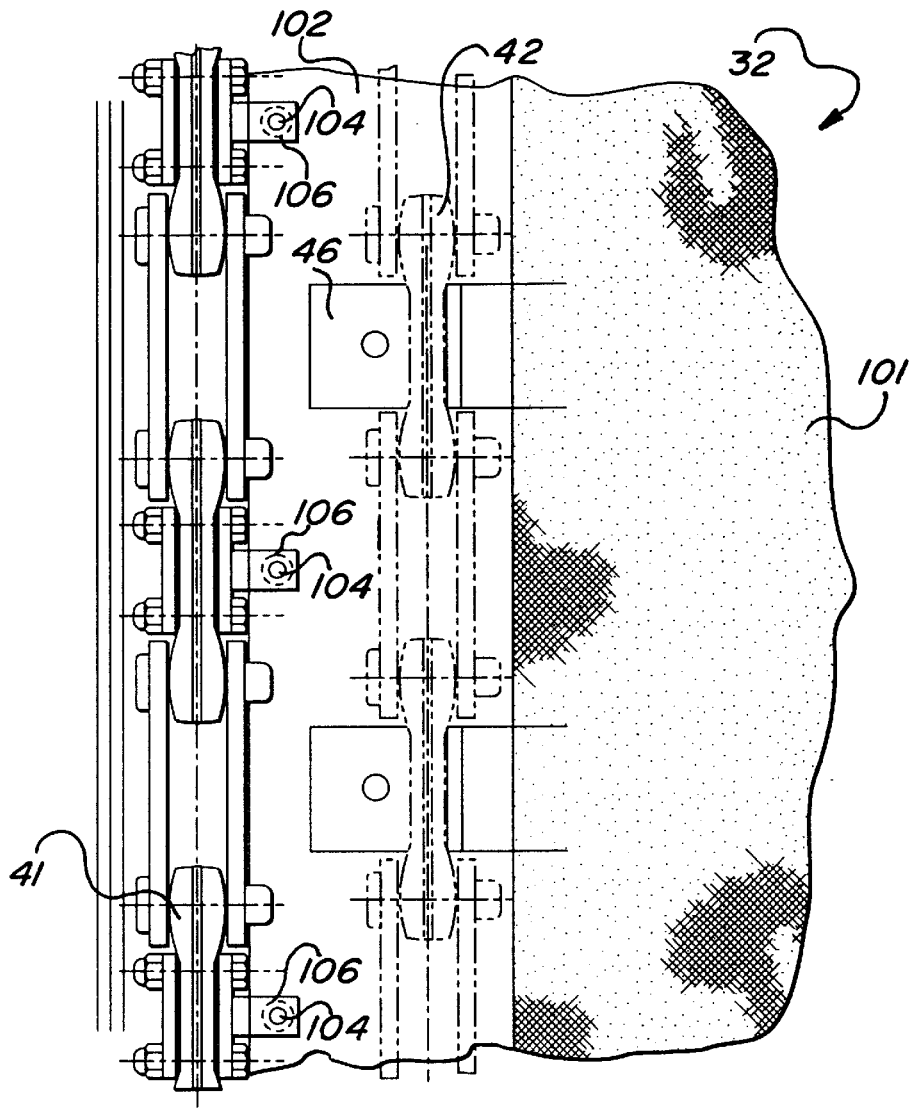
FIG. 5 is a bottom plan view of the arrangement of the first and second pairs of chain loops shown in FIG. 4.
Figure 6:
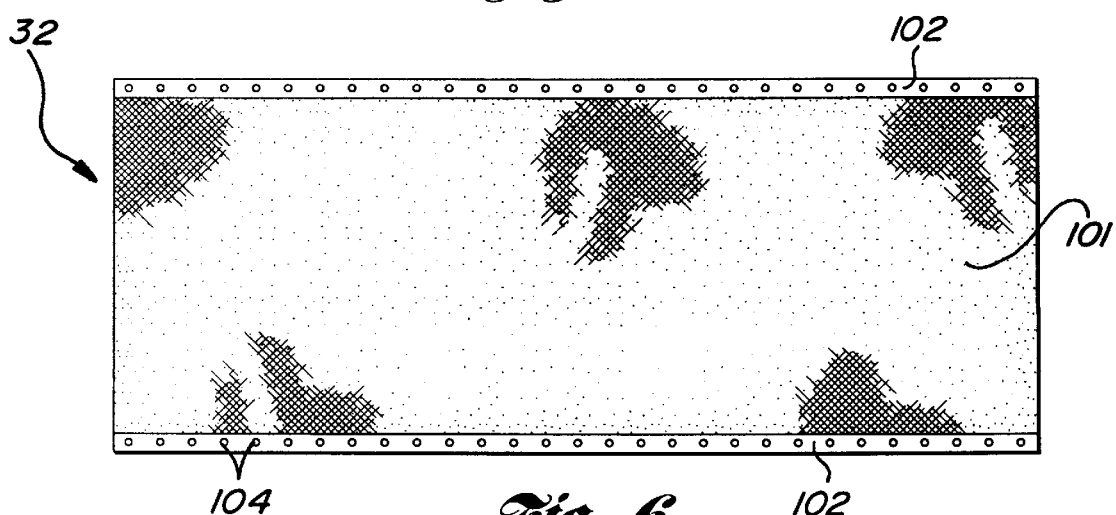
FIG. 6 is a view of the permanent filter belt of a filter embodying the present invention.

Turning now to FIGS. 4–6, permanent filter belt 32 and the arrangement of first and second pairs of chain loops 41 and 42 are illustrated in further detail. Permanent filter belt 32 includes a main filter section 101 and two spaced apart attachment portions 102 at each end of the main filter section. Disposable filter strip 50 may be interposed between permanent filter belt 32 and flights 46. Spaced apart grommets 104 run along attachment portions 102.

First pair of chain loops 41 includes grommet attachments 106 such as lugs or the like. Grommet attachments 106 are attached to links of each of chain loops 41 and are arranged periodically to extend in-wardly therefrom into tank 22. Grommets 104 attach to grommet attachments 106 by screws 108 or the like such that permanent filter belt 32 extends between chain loops 41.

Flights 46 of drag conveyor 44 are attached across links of second pair of chain loops 42. As seen best in FIGS. 4–5, unlike the liquid filters of the prior art, permanent belt filter 32 is driven independently of drag conveyor 44. That is, permanent belt filter 32 is not attached or frictionally engaged with drag conveyor 44 or chain loops 42. Permanent belt filter 32 is directly attached to chain loops 41 which are dedicated for the sole use of the permanent belt filter.

Preferably, permanent belt filter 32 includes segments that are connected together at a single location. Accordingly, the length of permanent belt filter 32 may be shortened or lengthened by adjusting the segments accordingly and then connecting them together at the single location.

As shown best in FIGS. 7–8, permanent belt filter 32 includes segments 120(a–b). Segments 120(a–b) are connected together by a hinge pin 122. Hinge material 124 surrounds hinge pin 122. A resin/glue mixture section 126 supports hinge material 124 to main filter section 101 of segments 120(a–b). A hook and loop fastener strip 128 is provided on segment 120a near hinge pin 122. A flap 130 attaches to strip 128 to connect segment 120b to segment 120a.

Referring now to FIG. 9, a schematic illustrating drive mechanism 66 for driving first and second pairs of chain loops 41 and 42, respectively, is shown. Drive mechanism 66 includes a motor 140 having a drive shaft 142 for imparting rotary energy. Drive shaft 142 is connected to a drive sprocket 144. Drive belt 68, shown as a chain as shown in FIG. 9, engages drive sprocket 144. Drive chain 68 couples a drag conveyor shaft 146 and an idler shaft 148 to drive shaft 142.

Drive chain 68 engages a sprocket 150 attached to drag conveyor shaft 146 for driving the drag conveyor shaft in a given direction. A sprocket 160 is attached to drag conveyor shaft 146. Second pair of chain loops 42 engage sprocket 160 to move in the given direction when drive chain 68 drives drive conveyor shaft 146.

Similarly, drive chain 68 engages a sprocket 152 attached to idler shaft 148 for driving the idler shaft in the given direction. Idler shaft 148 includes an idler gear 154.

A gear 158 attached to permanent filter belt shaft 156 is operable with idler gear 154 such that drag conveyor shaft 146 and the permanent filter belt shaft rotate in opposite directions when driven by drive chain 68. A sprocket 162 is attached to permanent filter belt shaft 156. First pair of chain loops 41 engage sprocket 162 to move in a direction opposite the given direction when drive chain 68 drives permanent filter belt shaft 156.

As known to those of ordinary skill in the art, gears 154 and 158 may have different tooth configurations such that drag conveyor shaft 146 and permanent filter belt shaft 156 rotate in opposite directions at different speeds. Accordingly, permanent filter belt 32 and drag conveyor 44 may move at different speeds along their respective circulating paths. Of course, gears 154 and 158 may have the same tooth configurations such that shafts 146 and 156 rotate at the same speed.

Thus it is apparent that there has been provided, in accordance with the present invention, a filter having dual drive loops for driving a permanent media belt and a drag conveyor that fully satisfies the objects, aims, and advantages set forth above.

While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A filter apparatus comprising:

an upper tank for holding dirty liquid and having a perforated plate;

a lower compartment beneath the perforated plate for receiving liquid from the upper tank through the perforated plate;

a permanent filter belt for filtering particulate from the dirty liquid and arranged in a first circulating path across the perforated plate;

a first pair of spaced apart drive loops attached on respective sides of the permanent filter belt;

a drag conveyor having a series of spaced apart flights and arranged in a second circulating path across the perforated plate, wherein the permanent filter belt is positioned between the perforated plate and the flights of the drag conveyor across the perforated plate;

a second pair of spaced apart drive loops attached on respective sides of the flights; and a driving mechanism operable with the first and second pairs of drive loops for indexing the permanent filter belt and the drag conveyor along the respective circulating paths such that a fresh segment of the permanent filter belt is periodically indexed over the perforated plate while a dirty segment of the permanent filter belt is being cleaned and the flights of the drag conveyor are periodically indexed to carry away accumulated particulate filtered by the permanent filter belt.

2. The apparatus of claim 1 wherein:

the driving mechanism indexes the permanent filter belt counter-clockwise along the first circulating path.

3. The apparatus of claim 2 wherein:

the driving mechanism indexes the drag conveyor clockwise along the second circulating path.

4. The apparatus of claim 3 wherein:

the driving mechanism is operable to index the first and second pairs of drive loops at the same speed along the respective circulating paths.

5. The apparatus of claim 3 wherein:

the driving mechanism is operable to index the first and second pairs of drive loops at different speeds along the respective circulating paths.

6. The apparatus of claim 1 wherein:

the permanent filter belt includes spaced apart attachment portions having grommets running along the attachment portions; and the first pair of drive loops include grommet attachments operable with the grommets for attaching the permanent filter belt to the first pair of drive loops.

7. The apparatus of claim 1 wherein:

the second pair of drive loops engages a drag conveyor shaft, and the driving mechanism includes a drive shaft for providing rotary energy and a drive belt operable with the drive shaft and the drag conveyor shaft for transferring the rotary energy from the drive shaft to the drag conveyor shaft.

8. The apparatus of claim 7 wherein:

the driving mechanism further includes an idler shaft operable with the drive belt for receiving the rotary energy from the drive shaft.

9. The apparatus of claim 8 wherein:

the first pair of drive loops engages a permanent filter belt shaft provided with a shaft gear, and the idler shaft includes an idler gear operable with the shaft gear to transfer the rotary energy from the drive shaft to the permanent filter belt shaft.

10. The apparatus of claim 1 wherein:

at least one of the first and second pairs of drive loops are chain loops.

11. The apparatus of claim 1 wherein:

at least one of the first and second pairs of drive loops are belt loops.

12. The apparatus of claim 1 further comprising:

a primary tank having an upper compartment for holding dirty liquid and having a perforated plate, and a lower compartment beneath the perforated plate for receiving liquid from the upper compartment through the perforated plate, wherein the lower compartment of the primary tank is connected to the upper tank.

13. The apparatus of claim 1 further comprising:

a disposable media strip positioned between the permanent filter belt and the flights of the drag conveyor across the perforated plate for filtering particulate from the dirty liquid.

14. In an improved filter apparatus including an upper tank for holding dirty liquid and having a perforated plate, a lower compartment beneath the perforated plate for receiving liquid from the upper tank through the perforated plate, a permanent filter belt for filtering particulate from the dirty liquid and arranged in a first circulating path across the perforated plate, and a drag conveyor having a series of spaced apart flights and arranged in a second circulating path across the perforated plate such that the permanent filter belt is positioned between the perforated plate and the flights of the drag conveyor across the perforated plate, wherein the improvement comprises:

a first pair of spaced apart drive loops attached on respective sides of the permanent filter belt;

a second pair of spaced apart drive loops attached on respective sides of the flights; and a driving mechanism operable with the first and second pairs of drive loops for indexing the permanent filter belt and the drag conveyor along the respective circulating paths such that a fresh segment of the permanent filter belt is periodically indexed over the perforated plate while a dirty segment of the permanent filter belt is being cleaned and the flights of the drag conveyor are periodically indexed to carry away accumulated particulate filtered by the permanent filter belt.

15. A method for moving the permanent filter belt and the drag conveyor in a filter apparatus including an upper tank for holding dirt liquid and having a perforated plate, a lower compartment beneath the perforated plate for receiving liquid from the upper tank through the perforated plate, a permanent filter belt for filtering particulate from the dirty liquid and arranged in a first circulating path across the perforated plate, and a drag conveyor having a series of spaced apart flights and arranged in a second circulating path across the perforated plate such that the permanent filter belt is positioned between the perforated plate and the flights of the drag conveyor across the perforated plate, comprising:

attaching the permanent filter belt across a first pair of spaced apart drive loops; attaching the flights of the drag conveyor across a second pair of spaced apart drive loops; and driving the first and second pairs of drive loops to move the permanent filter belt and the drag conveyor along the respective circulating paths such that a fresh segment of the permanent filter belt is being cleaned and the flights of the drag conveyor are periodically indexed to carry away accumulated particulate filtered by the permanent filter belt.

16. The method of claim 15 wherein:

the first pair of drive loops is driven to move the permanent filter belt counter-clockwise along the first circulating path.

17. The method of claim 16 wherein:

second pair of drive loops is driven to move the drag conveyor clockwise to the first direction along the second circulating path.

18. The method of claim 17 wherein:

the first and second pairs of drive loops are driven at the same speed along the respective circulating paths.

19. The method of claim 15 wherein:

at least one of the first and second pairs of drive loops are chain loops.

20. The method of claim 15 wherein:

at least one of the first and second pairs of drive loops are belt loops.

\* \* \* \* \*